(12) United States Patent
Bowsher et al.

(10) Patent No.: US 9,822,910 B2
(45) Date of Patent: Nov. 21, 2017

(54) JOINT RESTRAINT ASSEMBLY

(71) Applicant: STAR PIPE PRODUCTS, LTD., Houston, TX (US)

(72) Inventors: Mark A. Bowsher, Richmond, TX (US); Sami Firoz, Katy, TX (US)

(73) Assignee: STAR PIPE PRODUCTS, LTD., Houston, TX (US)

( * ) Notice: Subject to any disclaimer, the term of this patent is extended or adjusted under 35 U.S.C. 154(b) by 0 days.

(21) Appl. No.: 15/060,075

(22) Filed: Mar. 3, 2016

(65) Prior Publication Data

US 2016/0341343 A1 Nov. 24, 2016

Related U.S. Application Data

(60) Provisional application No. 62/163,776, filed on May 19, 2015.

(51) Int. Cl.
F16L 17/00 (2006.01)
F16L 21/08 (2006.01)

(52) U.S. Cl.
CPC .................................. F16L 21/08 (2013.01)

(58) Field of Classification Search
USPC ........ 285/337, 403, 404, 339, 342, 113, 356
See application file for complete search history.

(56) References Cited

U.S. PATENT DOCUMENTS

| | | |
|---|---|---|
| 4,492,391 A | 1/1985 | Haines |
| 4,627,774 A | 12/1986 | Bradley |
| 4,635,970 A | 1/1987 | Haines |
| 4,779,900 A | 10/1988 | Shumard |
| 4,878,698 A | 11/1989 | Gilchrist |
| 4,896,903 A | 1/1990 | Shumard |
| 5,335,946 A | 8/1994 | Dent et al. |
| 5,544,922 A | 8/1996 | Shumard et al. |
| 5,662,170 A | 9/1997 | Donovan et al. |
| 5,772,252 A | 6/1998 | Malani |
| 6,015,170 A | 1/2000 | Carpenter |
| 6,065,784 A | 5/2000 | Lundstrom |
| 6,173,993 B1 | 1/2001 | Shumard et al. |
| 6,322,273 B1 | 11/2001 | Gentile, Jr. |
| 7,093,863 B2 | 8/2006 | Holmes et al. |
| 7,104,573 B2 | 9/2006 | Copeland |
| 7,108,289 B1 | 9/2006 | Holmes, IV et al. |
| 7,185,924 B1 | 3/2007 | Longacre et al. |
| 7,207,606 B2 | 4/2007 | Owen et al. |
| 7,266,875 B2 | 9/2007 | Longacre et al. |
| 7,341,288 B2 | 3/2008 | Lundstrom |
| 7,384,076 B2 | 6/2008 | Bradley et al. |

(Continued)

*Primary Examiner* — Aaron Dunwoody

(74) *Attorney, Agent, or Firm* — Mossman, Kumar & Tyler, PC

(57) ABSTRACT

An apparatus for restraining a member includes a gland, a plurality of bolts disposed in the gland, a plurality of wedges disposed in the gland, a "C" shaped clip, and a spacer. The gland has pockets and a face having an access opening providing lateral access to each pocket. Each gland pocket includes a wedge having teeth and a cavity. Each cavity includes a slot formed transverse to the bore. The clip is sized to slide through the access opening of the gland and shaped to be closely received in the slot of the wedge. The spacer attaches to the bold and has flexible prongs.

11 Claims, 3 Drawing Sheets

(56) References Cited

U.S. PATENT DOCUMENTS

| | | | |
|---|---|---|---|
| 7,484,775 B2 * | 2/2009 | Kennedy, Jr. | F16L 21/04 285/337 |
| 7,596,847 B2 | 10/2009 | Carstensen | |
| 7,618,071 B2 | 11/2009 | Jones et al. | |
| 7,661,731 B2 | 2/2010 | Bradley | |
| 7,815,225 B2 | 10/2010 | Jones et al. | |
| 8,235,427 B2 | 8/2012 | Jones et al. | |
| 8,894,100 B2 | 11/2014 | Eaton et al. | |
| 9,163,760 B2 | 10/2015 | Lundstrom et al. | |
| 2004/0062596 A1 | 4/2004 | Walworth et al. | |
| 2005/0047854 A1 | 3/2005 | Walworth et al. | |
| 2005/0275217 A1 | 12/2005 | Walworth et al. | |
| 2006/0012172 A1 | 1/2006 | Kennedy, Jr. et al. | |
| 2007/0120365 A1 | 5/2007 | Walworth et al. | |
| 2007/0241561 A1 | 10/2007 | Kennedy et al. | |
| 2008/0018104 A1 | 1/2008 | Walworth et al. | |
| 2011/0291409 A1 | 12/2011 | Kennedy, Jr. et al. | |
| 2012/0274063 A1 | 11/2012 | Kennedy, Jr. | |

* cited by examiner

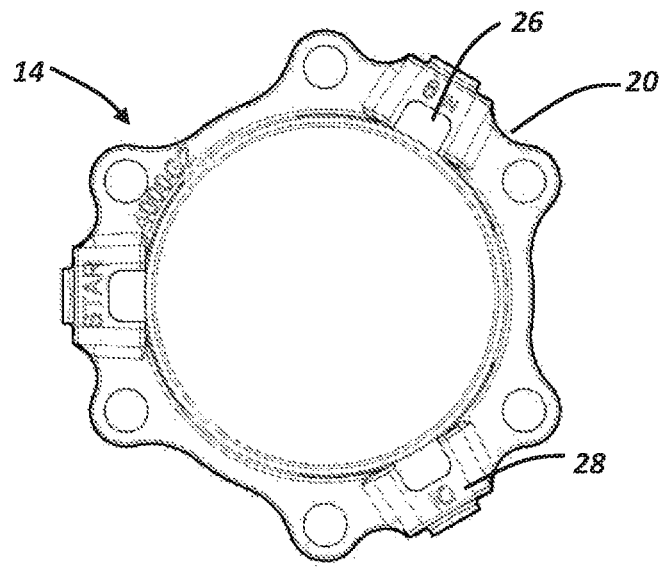
FIG. 2
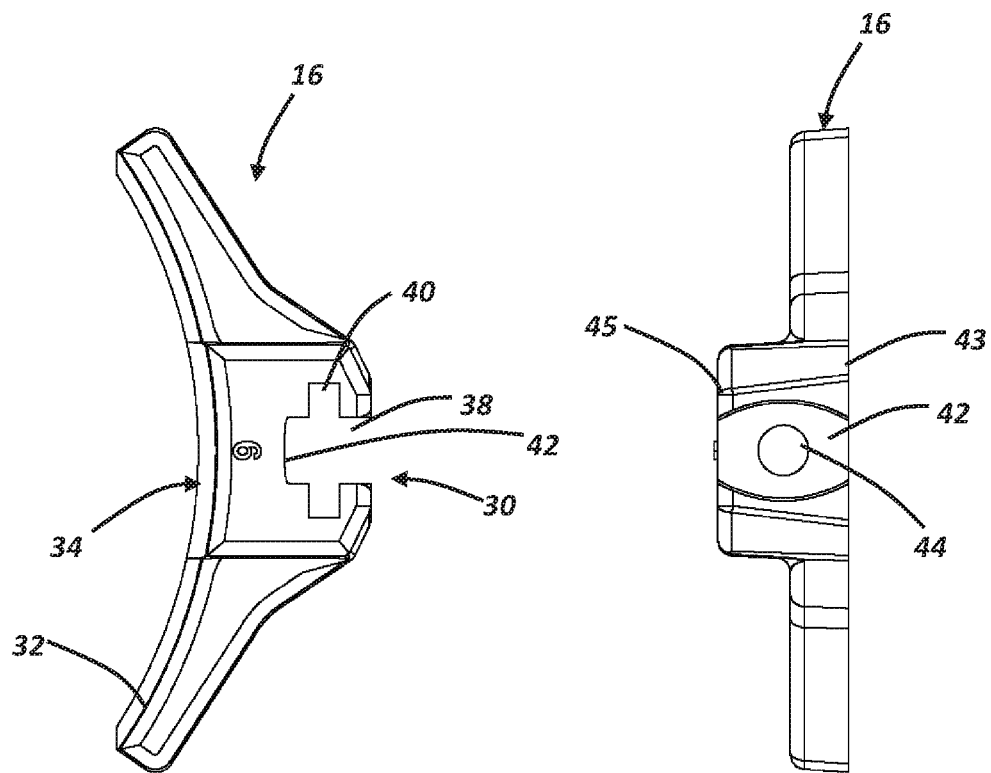
FIG. 3A
FIG. 3B

JOINT RESTRAINT ASSEMBLY

CROSS-REFERENCE TO RELATED APPLICATIONS

This application takes priority from U.S. Provisional Patent Application Ser. No. 62/163,776, titled "Joint Restraint Assembly," filed on May 19, 2015, the contents of which are incorporated by reference for all purposes.

BACKGROUND OF THE DISCLOSURE

1. Field of Disclosure

The present disclosure relates to joint restraints for tubular members.

2. The Related Art

Joint restraints are typically used to couple two axially-aligned tubular members such as pipes. A conventional joint restraint includes an annular body or gland fitted with a plurality of evenly spaced pads or wedges. Each pad has an associated bolt that, when rotated, urges the pad radially inward from a retracted position to an extended position. During extension, the teeth projecting out of the pad contact an outer surface of a first tubular member. The gland becomes substantially fixed onto the first tubular member as bolt rotation generates a clamping force that causes the teeth to penetrate or bite into the first tubular member. Mechanisms, such as a bolt or fastener, are used to connect the gland to a flange formed on a second pipe. Thus, a mechanical connection is established between the two tubular members.

SUMMARY OF THE DISCLOSURE

In aspects, the present disclosure provides an apparatus for restraining at least two tubular members. In one non-limiting embodiment, the apparatus includes a gland, a plurality of bolts disposed in the gland, a plurality of wedges disposed in the gland, a "C" shaped clip, and a spacer.

The gland may have a plurality of pockets, a threaded radial bore in communication with each pocket, and a face having an access opening providing lateral access to each pocket. Each bolt may have a head, a shoulder formed next to the head, a shank extending from the shoulder, and a round end projecting from the shank. The shank may include a threaded section and a neck having a diameter smaller than the threaded section. Each wedge may be disposed in an associated pocket, have a contact surface having a plurality of teeth, and cavity for receiving the end of the bolt. Each cavity may have a bore and a slot. The bore may be aligned to receive a portion of the shank and the bore may terminate at a bearing surface on which a recess is formed. The slot may be formed transverse to the bore. The rounded end of the bolt, the recess, and at least one tooth of the plurality of teeth may be radially aligned.

The "C" shaped clip may be sized to slide through the access opening of the gland. The clip may have a body shaped to be closely received in the slot of the wedge. The body may have flexible prongs configured to attach to the neck of the bolt.

The spacer may be configured to attach to the shank and seat between a shoulder of the bolt and an outer surface of the gland. The spacer may have flexible prongs that detach from the shank when the spacer is laterally moved away from the bolt.

The above-recited example of features of the disclosure have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the described embodiments, taken in conjunction with the accompanying drawings listed below:

FIG. 2 illustrates a side view of one embodiment of a gland made in accordance with the present disclosure;

FIGS. 3A-B illustrate a side view and top view, respectively, of one embodiment of a wedge made in accordance with the present disclosure;

DETAILED DESCRIPTION OF THE DISCLOSURE

Figure 1A:
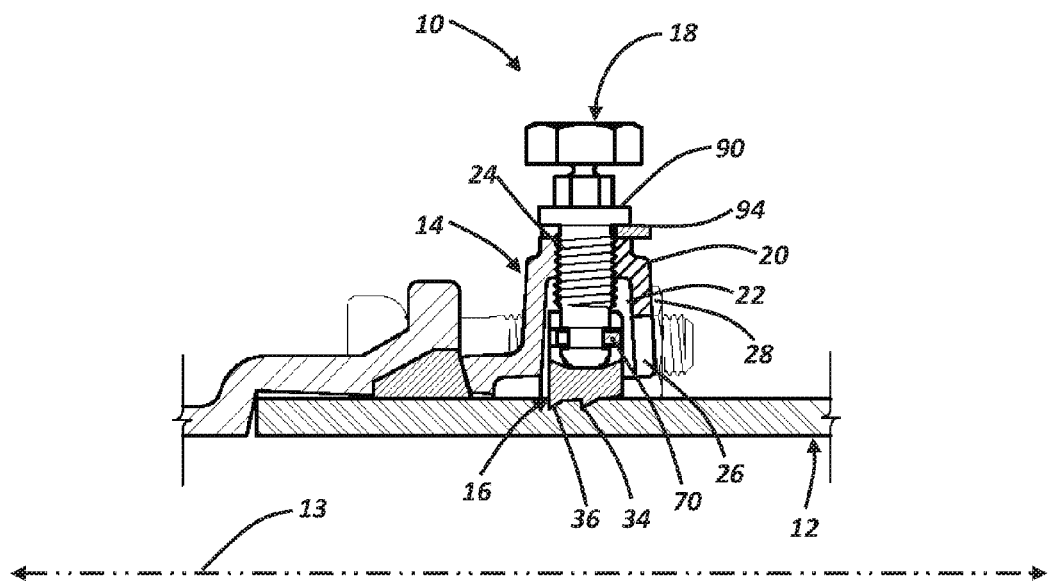
FIG. 1A illustrates a sectional side view of one embodiment of a joint restraint made in accordance with the present disclosure.

The present disclosure relates to devices and methods providing cost-effective joint restraints that provides an enhanced clamping force for joining tubular members. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

Figure 1B:
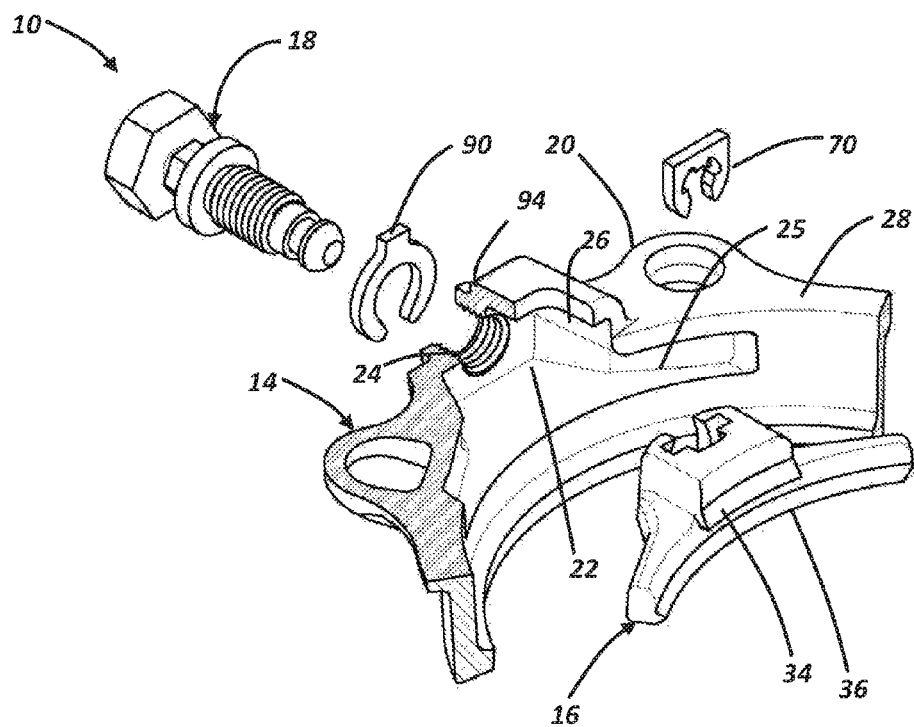
FIG. 1B illustrates an exploded isometric view of the FIG. 1A embodiment.

Referring initially to FIGS. 1A and 1B, there is illustrated an exemplary coupling 10 made in accordance with the present disclosure. The coupling 10 is shown positioned about an end of a tubular member 12, which may be a metal (e.g., ductile iron) or non-metal (e.g., PVC pipe). The coupling 10 may include a gland 14, a wedge 16 and a bolt 18. It will, of course, be understood that the wedge 16 and bolt 18 are merely representative of a plurality of wedges and bolts that are circumferentially distributed within the gland 14.

Referring to FIGS. 1A-B and 2, the gland 14 includes a generally ring-like body 20 (best seen in FIG. 2). An inner diametrical surface of the body 20 includes a plurality of pockets 22, each of which are in communication with a threaded radial bore 24. As used herein, the term "radial" refers to a direction aligned with a radius of the gland 14 (i.e., a line radiating from a center of the gland 14). The pocket 22 may be a box-shaped cavity for receiving the wedge 16 and the threaded radial bore 24 may be formed complementary to the threads formed on the bolt 18. Additionally, each pocket 22 includes a radially inward facing opening 25 and an access opening 26 formed on a face 28 of the body 20. The access opening 26 face laterally, which allows items to be laterally inserted into and removed from the pocket 22; i.e., through a surface defining the face 28 of the body 20.

Referring to FIGS. 1A-B and 3A,B, the wedge 16 is configured to apply a clamping force onto the outer surface of the tubular member 12. The wedge 16 may be disposed within the pocket 22 of the gland 14 and can move radially between a radially inward engaged position and a radially outward disengaged position. The wedge 16 includes a cavity 30, a clamping surface 32, and two or more teeth, e.g., inner tooth 34 and outer tooth 36. As shown, the teeth 34, 36 may have different lengths, e.g., the inner tooth 34 may have a width that is about the same as the width of the opening 26 and the outer tooth 36 may be the same width of the opening 25. The cavity 30 extends through and between two opposing and parallel surfaces 43, 45 of the wedge 16. In one embodiment, the cavity 30 may be defined by a bore 38 shaped to receive the bolt 18, a slot 40 oriented perpendicular to the bore 38, and a bearing surface 42. The slot 40 also extends through and between the two opposing and parallel surfaces 43, 45 of the wedge 16. It should be noted that the slot 40 is a lateral passage and is larger than the lateral passage formed by the bore 38. The bearing surface 42 includes a concave recess 44 shaped as a seat for a tip 56 (FIG. 4) of the bolt 18.

Figure 4:
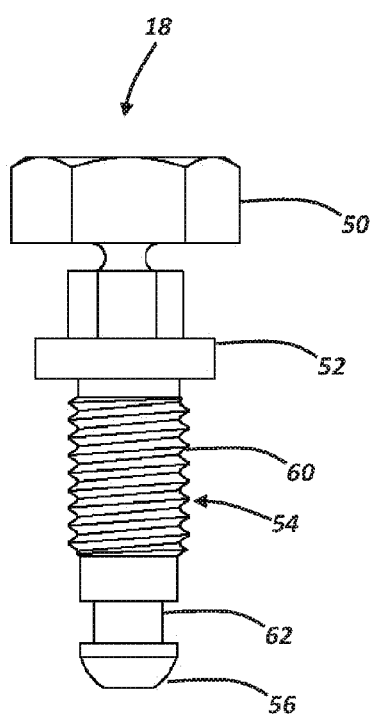
FIG. 4 illustrates a side view of one embodiment of a bolt made in accordance with the present disclosure.

Referring to FIGS. 1A-B and 4, the bolt 18 moves the wedge 16 between the engaged and disengaged position. While in the engaged position, the bolt 18 may be used to apply a downward axial force that thrusts the wedge 16 against the tubular member 12. In one embodiment, the bolt 18 has a head 50, a shoulder 52, shank 54, and a tip 56. The shank 54 includes a threaded portion 60 that is complementary to the threaded radial bore 24 of the gland 14 and a neck 62 that is smaller in diameter than the immediately adjacent sections of the shank 54. The tip 56 of the bolt 18 may be blunt or rounded to allow the wedge 16 to rock or pivot relative to the bolt 18.

The wedge 16 and the bolt 18 co-act to generate a clamping force on the tubular 12. In one arrangement, the recess 44 of the wedge 16 may be radially aligned within the inner tooth 34. This alignment positions the tip 56 of the bolt 18 in radial alignment with the inner tooth 34. Therefore, when the bolt 18 is rotated to press the wedge 16 against the tubular 12, the recess 44 guides the tip 56 to a location radially aligned with the inner tooth 34, which centers the thrust force over the inner tooth 34. Thus, in one aspect, a line radiating from and orthogonal to a longitudinal axis 13 of the member 12 will intersect a contact between the inner tooth 34 and the member 12 and a contact between the tip 56 and the wedge 16. Because the force vector is aligned with the interior tooth 34, axial motion of the tubular 12 can allow the wedge 16 to rotate, rock, or pivot about the tip 56 of the bolt 18, which drives the outer tooth 36 into the tubular 12.

Figure 5:
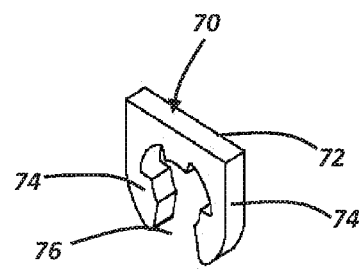
FIG. 5 illustrates an isometric view of one embodiment of a clip made in accordance with the present disclosure.

Referring to FIGS. 1A-B and 5, in embodiments, a clip 70 may be used to interlock the wedge 16 and the bolt 18. In one arrangement, the clip 70 may have a "C" shaped body 72 formed by two flexible prongs 74 separated by a gap 76. To allow flexure of the prongs 74 during installation, the body 72 may be formed of a resilient material such as a polymer. To ensure the clip 70 is secured within the wedge 16, the width and height of the body 72 may be selected to be closely received within the slot 40 of the wedge 16. It should be understood that any shape that has one or more prongs may be used (e.g., "U" or "V" shapes). For convenience, the term "C" shaped clip will be used to generally refer to any shape that has prongs that are separated by a gap.

In one mode of use, the bolt 18 is first installed in the gland 14 and the bolt tip 56 is fitted into the wedge 16. Next, the clip 70 is slid laterally through the access opening 26, which are at least as wide as the clip 70, and pressed against the neck 62 of the bolt shank 54. A suitable tool, if needed, may be used to grasp the body 72 to manipulate the clip 70. When sufficient force is applied, the prongs 74 flex open, slip around the neck 62, and then snap back to the original shape. At the same time, the body 72 slides into and nests within the slot 40. At this point, the clip 70 provides a positive physical engagement between the wedge 16 and the bolt 18. Optionally, to allow the wedge 16 to move freely within the pocket 22, the clip 70 may be sized to be no larger than the pocket 22. Thus, the bolt 18 may be rotated to move the wedge 16 radially outward until the clip 70 is no longer accessible through the access opening 16. In this position, the clip 70 is captured within the pocket 22, which may be advantageous during shipment or pre-installation handling.

Figure 6:
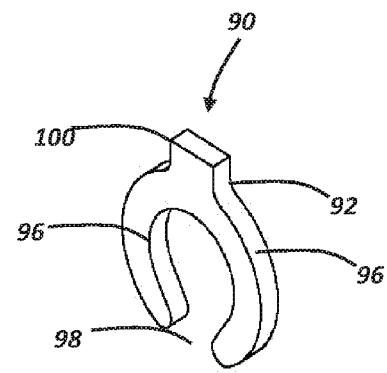
FIG. 6 illustrates an isometric view of one embodiment of a spacer made in accordance with the present disclosure.

Referring to FIGS. 1A-B and 6, in embodiments, a spacer 90 may be used to control the distance the bolt 18 travels toward the tubular 12. The spacer 90 may have a "C" shaped body 92 that seats between the bolt shoulder 52 and an outer surface 94 of the gland 14. The body 92 may have two flexible prongs 96 that are arranged to fit around the shank 54. A gap 98 separates the prongs 96. A tab 100 may be formed on the body 92 to facilitate assembly or disassembly. It should be understood that any shape that has one or more prongs may be used (e.g., "U" or "V" shapes).

The body 92 may be formed of a resilient material such as a polymer that allows the prongs 96 to deform when pressed against the shank 54. This allows the body 92 to flex open, at least partially surround the shank 54, and then return to the original shape. However, the material is sufficiently rigid in order to resist deformation when compressed between the bolt shoulder 52 and the outer surface 94. By remaining relatively rigid, the spacer 90 can prevent the bolt 18 from travelling radially inward into the tubular 12 beyond a desired distance. This may be useful to prevent the wedge 16 and teeth 34, 36 from penetrating into the tubular 12 beyond a desired depth. When depth control is not required, then the spacer 90 may be removed by simply pulling laterally on the tab 100 while the bolt 18 is still attached to the gland 14. That is, unlike a washer, the spacer 90 does not require disassembly of the bolt 18 for removal.

Referring to FIG. 1A, the term "lateral direction" refers to a direction parallel with a long axis 13 of the pipe 12. The term "lateral" or "lateral face" refers to facing a direction parallel with the long axis 13. The term "radial direction" refers to a direction radiating and orthogonally from the long axis 13. The term "radially facing" refers to facing a direction radiating and orthogonally from the long axis 13.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. Thus, it is intended that the following claims be interpreted to embrace all such modifications and changes.

We claim:

1. An apparatus for restraining a member, comprising:
   a gland having a plurality of pockets, a threaded radial bore communicating with each pocket, and a face having an access opening providing lateral access to each pocket;
   a bolt disposed in each pocket, each bolt having a head, a shoulder formed next to the head, a shank extending from the shoulder, and a round end projecting from the shank, wherein the shank includes a threaded section and a neck having a diameter smaller than the threaded section, the threaded section being complementary to the threaded radial bore;

a wedge disposed in each gland pocket, each wedge having a contact surface from which a plurality of teeth project and a cavity for receiving the end of the bolt, the cavity having:
- a bore aligned to receive a portion of the shank, the bore terminating at a bearing surface on which a recess is formed, and
- a slot formed transverse to the bore, wherein the rounded end of the bolt, the recess, and at least one tooth of the plurality of teeth are radially aligned;

a "C" shaped clip sized to slide through the access opening of the gland, the clip having a body shaped to be closely received in the slot of the wedge, the body having flexible prongs configured to at least partially enclose the neck of the bolt; and a spacer configured to at least partially enclose the shank and seat between a shoulder of the bolt and an outer surface of the gland, the spacer having flexible prongs that detach from the shank when the spacer is laterally moved away from the bolt.

2. The apparatus of claim 1, wherein each pocket has a radially inward facing opening and wherein each access opening faces laterally and is at least as wide as the "C" shaped clip.

3. The apparatus of claim 1, wherein the shoulder of each bolt is diametrically larger than the shank extending from the shoulder, and the neck of each bolt is diametrically smaller than the shank.

4. The apparatus of claim 1, wherein the plurality of teeth includes at least two parallel teeth, the slot is a laterally wider passage than the bore, and the cavity extends through and between two parallel surfaces of the wedge.

5. The apparatus of claim 1, wherein at least one tooth of the at least two parallel teeth is no wider than the associated pocket, and wherein at least one other tooth of the at least two parallel teeth is wider than the associated pocket.

6. The apparatus of claim 1, wherein each wedge and each associated access opening are configured to capture each associated "C" shaped clip within the associated pocket by moving the associated wedge radially outward.

7. The apparatus of claim 1, wherein a contact point between the rounded end of the bolt against a surface defining the recess and a contact point between the at least one tooth of the plurality of teeth and the member are radially aligned.

8. A joint restraint, comprising:
a gland having a plurality of pockets, a threaded radial bore communicating with each pocket, and a face having an access opening providing lateral access to each pocket, wherein each pocket has a radially inward facing opening and wherein each access opening faces laterally;

a bolt disposed in each pocket, each bolt having a head, a shoulder formed next to the head, a shank extending from the shoulder, and a round end projecting from the shank, wherein the shank includes a threaded section and a neck having a diameter smaller than the threaded section, the threaded section being complementary to the threaded radial bore, wherein the shoulder of each bolt is diametrically larger than the shank extending from the shoulder, and the neck of each bolt is diametrically smaller than the shank;

a wedge disposed in each gland pocket, each wedge having a contact surface from which a plurality of teeth project and a cavity for receiving the end of the bolt, the cavity having:
- a bore aligned to receive a portion of the shank, the bore terminating at a bearing surface on which a recess is formed, and
- a slot formed transverse to the bore, wherein the rounded end of the bolt, the recess, and at least one tooth of the plurality of teeth are radially aligned;

a "C" shaped clip sized to slide through the access opening of the gland, the clip having a body shaped to be closely received in the slot of the wedge, the body having flexible prongs configured to at least partially enclose the neck of the bolt, wherein the "C" shaped clip is at least as wide as the access opening of the gland, wherein each wedge and each associated access opening are configured to capture each associated "C" shaped clip within the associated pocket by moving the associated wedge radially outward; and a spacer configured to at least partially enclose the shank and seat between a shoulder of the bolt and an outer surface of the gland, the spacer having flexible prongs that detach from the shank when the spacer is laterally moved away from the bolt.

9. The joint restraint of claim 8, wherein the plurality of teeth includes at least two parallel teeth, the slot is a laterally wider passage than the bore, and the cavity extends through and between two parallel surfaces of the wedge.

10. The joint restraint of claim 8, wherein at least one tooth of the at least two parallel teeth is no wider than the associated pocket, and wherein at least one other tooth of the at least two parallel teeth is wider than the associated pocket.

11. An apparatus for restraining a member, comprising:
a gland having a plurality of pockets, a threaded radial bore communicating with each pocket, and a face having an access opening providing lateral access to each pocket, the lateral opening being transverse to the threaded radial bore;

a bolt disposed in each pocket, each bolt having a head, a shoulder formed next to the head, a shank extending from the shoulder, and a round end projecting from the shank, wherein the shank includes a threaded section and a neck having a diameter smaller than the threaded section, the threaded section being complementary to the threaded radial bore;

a wedge disposed in each gland pocket, each wedge having a contact surface from which a plurality of teeth project and a cavity for receiving the end of the bolt, the cavity having:

a bore aligned to receive a portion of the shank, the bore terminating at a bearing surface on which a recess is formed, wherein the rounded end of the bolt contacts the bearing surface, and a slot formed transverse to the bore, the slot being defined by a plurality of parallel surfaces, wherein the rounded end of the bolt, the recess, and at least one tooth of the plurality of teeth are radially aligned;

a "C" shaped clip sized to slide through the access opening of the gland, the clip having a body shaped to pass between the plurality of parallel surfaces defining the slot of the wedge, the body having flexible prongs configured to at least partially enclose the neck of the bolt; and a spacer configured to at least partially enclose the shank and seat between a shoulder of the bolt and an outer surface of the gland, the spacer having flexible prongs that detach from the shank when the spacer is laterally moved away from the bolt.

\* \* \* \* \*